US012238085B1

United States Patent
Yancey et al.

(10) Patent No.: US 12,238,085 B1
(45) Date of Patent: Feb. 25, 2025

(54) USING A CERTIFICATE-BASED PROTOCOL TO ENFORCE COMPLIANCE OF DEVICES WITH SPECIFICATIONS

(71) Applicant: Amazon Technologies, Inc., Seattle, WA (US)

(72) Inventors: Justin Paul Yancey, Seattle, WA (US); Jack A. Drooger, Seattle, WA (US); Sanjay Dey, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 16/588,980

(22) Filed: Sep. 30, 2019

(51) Int. Cl.
*H04L 9/40* (2022.01)

(52) U.S. Cl.
CPC ...... *H04L 63/0823* (2013.01); *H04L 63/0272* (2013.01); *H04L 63/1433* (2013.01); *H04L 63/20* (2013.01)

(58) Field of Classification Search
CPC ............. H04L 63/0823; H04L 63/0272; H04L 63/1433; H04L 63/20; H04L 9/006; H04L 9/3263; G06F 21/33; G06F 21/577; H04W 12/069
See application file for complete search history.

(56) References Cited

U.S. PATENT DOCUMENTS

| 8,565,726 | B2 | 10/2013 | Walker et al. | |
|---|---|---|---|---|
| 8,949,597 | B1* | 2/2015 | Reeves | H04L 9/3268 726/4 |
| 2014/0310771 | A1* | 10/2014 | Marshall | H04L 63/108 726/2 |
| 2016/0099969 | A1* | 4/2016 | Angus | H04L 9/3268 713/158 |
| 2016/0344736 | A1 | 11/2016 | Khait et al. | |
| 2017/0223012 | A1* | 8/2017 | Xu | H04L 63/0815 |
| 2018/0159842 | A1* | 6/2018 | Lurey | H04W 12/068 |
| 2020/0028879 | A1* | 1/2020 | Lahiri | H04W 12/08 |
| 2020/0052908 | A1* | 2/2020 | Thitron | H04L 63/20 |

(Continued)

OTHER PUBLICATIONS

Esther Palonar et al., Certificate-based Access Control in Pure P2P Networks, Oct. 2006, pp. 1-8 (Year: 2006).*

(Continued)

*Primary Examiner* — Luu T Pham
*Assistant Examiner* — Canh Le
(74) *Attorney, Agent, or Firm* — Robert C. Kowert; Kowert, Hood, Munyon, Rankin & Goetzel, P.C.

(57) ABSTRACT

A device management service may enforce compliance of remote devices with device specifications by disabling or enabling use of client certificates by applications installed on the devices. The device management service receives configuration data from an agent installed on the remote device. If the device management service determines that the device is no longer compliant with specifications for the device, then the device management service may prevent subsequent use of client certificate(s) by applications on the device to establish certificate-based connections. For example, the device management service may disable or revoke a client certificate or may instruct the device to disable or remove the client certificate. If the device becomes compliant at a subsequent time, then the device management service may enable the client certificate or cause a new client certificate to be sent to the device.

19 Claims, 6 Drawing Sheets

(56) References Cited

U.S. PATENT DOCUMENTS

2020/0287910 A1\* 9/2020 Zerrad .................. H04L 63/102
2021/0037011 A1\* 2/2021 Kelley .................. H04L 9/3247
2021/0273817 A1\* 9/2021 Deriso ................... H04L 9/083

OTHER PUBLICATIONS

Ana Kulec et al.,, Implement of Certificate Based authentication in IKEv2 Protocol, 2007, pp. 697-702 (Year: 2007).\*

\* cited by examiner

USING A CERTIFICATE-BASED PROTOCOL TO ENFORCE COMPLIANCE OF DEVICES WITH SPECIFICATIONS

BACKGROUND

The Internet of Things (IoT) is a phrase given for the interconnection of computing devices scattered around the globe within the existing internet infrastructure. IoT devices may be used for a variety of consumer and commercial applications. For example, a company may issue a smart phone or laptop to an employee to perform various business transactions on behalf of the company. In many cases, an employee of a company may use their own personal smart phone or a laptop computer for both personal and business use. This may allow an employee to quickly begin performing various business-related tasks without waiting for a company-owned smart phone or laptop to be set up and issued to the employee.

A mobile device management (MDM) service may be used by a company to assess the "posture" of a managed device (e.g., the hardware and/or software configuration) and it may take appropriate quarantine actions (e.g., disabling the application) if it detects that a device is not compliant. However, the MDM service may only be able to take action on applications that it installed on the device (e.g., "managed" applications). If an application was installed from another source, such as an app store, then the MDM service may be unable to disable the application. Continued operation of the application on a non-compliant device may introduce security vulnerabilities or cause various incompatibility issues with other applications used by the company (e.g., on the company's network). Moreover, any authenticated sessions that a user has established while the device was compliant may remain valid even when the device falls out of compliance (e.g., when the device is quarantined).

Figure 1:
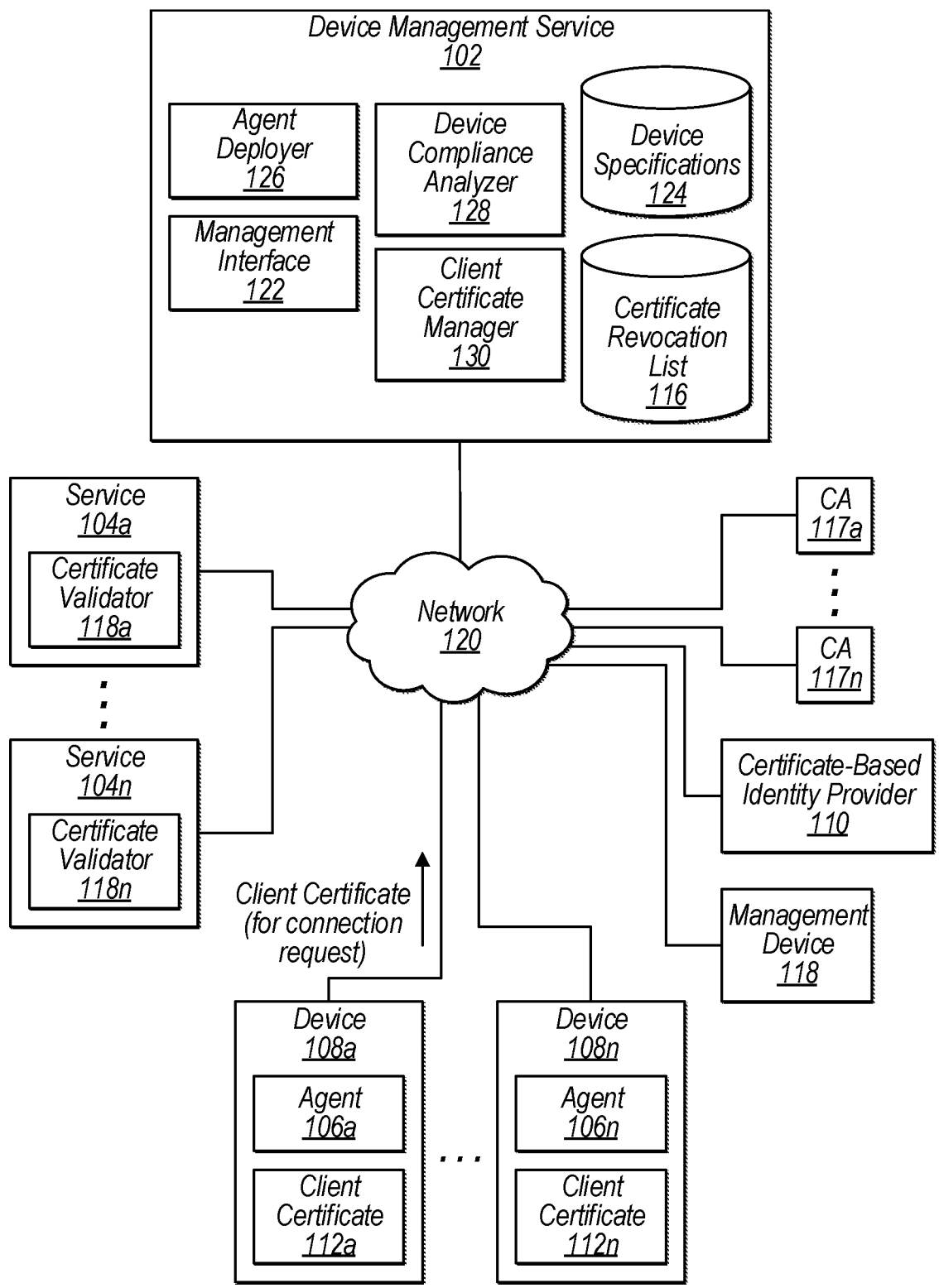
FIG. 1 illustrates a system for using a certificate-based protocol to enforce compliance of devices with specifications, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for using a certificate-based protocol to enforce compliance of devices with specifications. A device (e.g., an IoT device) may have one or more applications that establish connections with other applications (e.g., services) by providing a client certificate (e.g., an X.509 public key certificate) according to a certificate-based protocol (e.g., transport layer security (TLS)). In embodiments, a device management service may determine that a configuration of the device is no longer compliant with one or more specifications for the device (e.g., hardware and/or software specifications). In response to determining that the configuration of the device is no longer compliant, the device management service may prevent subsequent use of the client certificate(s) by the application(s) on the device (e.g., by revoking or otherwise disabling the certificate).

As an example, an employee may download, from a device management service, a database client application to access a database hosted on a company's network. In order for the employee to use the database client application, the device management service may verify whether the laptop uses a particular version of an operating system (e.g., for security requirements). If the laptop does not use the particular version, then the device management service may simply disable the database client application. However, if the device management service did not originally install the application, the device management service is unable to disable it using the typical methods. Various embodiments may provide techniques that prevent the application from establishing a connection (in effect, "disabling" the application), even though the device management service may not have installed the application and/or manage/control the application.

In various embodiments, in order to establish a secure connection session with a remote client, an application running on a server (e.g., at a service provider) may require the remote client to provide a client certificate (e.g., X.509 certificate) that has been issued to the client by a trusted certificate authority (CA). For example, when a service provider receives a request from the client to establish a connection session using a secure communication protocol (e.g., transport layer security (TLS)), a service may request a client certificate from the client and verify the digital signature of the CA that issued the client certificate to the client.

In embodiments, as part of the authentication process for a certificate-based connection, the service may download a certificate revocation list (CRL) from the CA that issued the client certificate. If the CRL indicates that the client certificate provided by the client has been revoked, then the service provider may reject the connection request from the client.

FIG. 1 illustrates a system for using a certificate-based protocol to enforce compliance of devices with specifications, according to some embodiments. In embodiments, the device management service 102, the services 104, agents 106, and/or any other components depicted in FIG. 1 may be the same as or include one or more of the same components as the device management service, the services, agents, and/or any other components depicted in any of FIGS. 2-5. FIG. 6 depicts an example computer system(s) that may implement the services, agents, networks, and/or any other components depicted in any of FIGS. 1-5.

In embodiments, an application running on a device 108 (e.g., client device 108a) may send a request to a service 104 to establish a connection (e.g., to access/use one or more functions of the service such as data computation and/or data storage/access functions). In various embodiments, the device 108 may include any number of applications that may send any number of requests to any number of different services over any given time period. In some embodiments, any number of such devices 108 may include such applications.

In response to receiving the request to establish a connection, the service may process the request to determine whether to accept or reject the request in accordance with a certificate-based connection protocol. In embodiments, another service may perform some or all of the functionality described herein to process a given request to connect to the service. For example, the service may redirect the client to another request-processing service in response to receiving the request to establish a connection (e.g., by providing a response to a client web browser that includes a URL address/endpoint for the other request-processing service, such as a certificate-based identity provider 110).

In the illustrative embodiment, the service 104a may obtain a client certificate from the device 108a. For example, the service 104a may request a client certificate form the device 108a and in response, the device 108 may send the client certificate to the service 104a (e.g., client certificate 112). In some embodiments, the device 108 may send the client certificate as part of the request to establish a connection. After the service obtains the client certificate 112, the service may process the client certificate to determine whether or not the client certificate 112 is valid (e.g., using a certificate validator 114).

As part of the process to validate a client certificate (e.g., client certificate 112), the certificate validator 114 may perform a lookup on a CRL 116 of a data store of the device management service (or a CRL at another location, such as a CRL maintained by the service) based on information that uniquely identifies the client certificate. In embodiments, if results of the lookup indicate that the client certificate is included in the CRL, then the service determines that the certificate is revoked and denies the request to establish a connection.

In various embodiments, any number of other actions associated with certificate-based connection protocols may also be performed by the certificate validator or other certificate processing components of the service (or other services) to validate/accept or invalidate/reject the client certificate (e.g., if it is determined that the certificate has not been revoked). For example, the service may obtain the client certificate from the client and authenticate it based on a CA certificate stored by the service itself, the device management service, or another service.

In embodiments, the service may extract the client certificate from a request to establish a connection (or otherwise obtain the certificate) and validate or invalidate the client certificate (e.g., determine whether the client certificate was signed by a trusted CA 116, whether it is expired, etc.). For example, the service may identify one or more registered CA certificates or a preconfigured CA chain (e.g., obtained/ downloaded by the provider network from a trusted CA) and validate the client certificate against the one or more registered CA certificates or the preconfigured CA chain.

A service may validate the client certificate based on security information associated with (e.g., included in) one or more registered CA certificates obtained/access by the service. For example, a public key included in one of the registered CA certificates that was downloaded from a trusted CA may be used to determine whether the client certificate has been signed by the same trusted CA that signed the client certificate. If so, then the client certificate may be validated. If not, then it may be invalidated.

In some embodiments, the device management service 102, the devices 108, the services 104, the CAs 116, the certificate-based identity provider 110, a management device 118, and any other number of remote devices, services, and/or networks may communicate with each other via a wide area network 120 (e.g., the internet). The management interface may be used to configure the device management service via an application programming interface (API), such as a management interface. Therefore, in embodiments, any of the above components may be remote with respect to another other component.

In embodiments, the device management service may use a certificate-based protocol to enforce compliance of any of the devices 108 with specifications 124 for the device. As depicted, the device management service includes an agent deployer 126 to deploy agents to the devices 108, a device compliance analyzer 128 to determine, based on data received from a device, whether a configuration of the device is compliant with one or more specifications 124 for the device and sending notifications of compliance status of different devices. The device management service may also include a client certificate manager 130. As described herein, the client certificate manager may perform various actions to manage certificates 112 of the devices 108 (e.g., revoking, disabling, enabling certificates, etc.).

In some embodiments, at least some of all of the functionality described herein for an agent may be embedded and/or included within the device instead of being downloaded from the device management service. For example, instructions may be included in firmware and/or software installed on the device by a manufacturer and/or the service provider before shipping the device to the client.

In various embodiments, the device management service may determine that a configuration of a particular device is no longer compliant with one or more specifications for the device. In response to the determination that the configuration of the device is no longer compliant with the one or more specifications for the device, the device management service may prevent subsequent use of the client certificate(s) to establish connections with the services.

In embodiments, if there are two or more client certificates that are used by two or more corresponding applications of the device to establish connections with corresponding services, then the device management service may prevent subsequent use of the two or more client certificates (and enable certificates or cause new certificates to be provided), according to any of the techniques described herein for a single client certificate. In some embodiments, one or more applications on a device may be managed applications (e.g., installed and/or controlled at least in part by the device management service) while one or more other applications on the device may be non-managed applications (e.g., not installed by or under control of the device management service).

In response to determining that the device is no longer compliant, the device management service may prevent subsequent use of one or more client certificates by one or more of the non-managed applications (e.g., using any of the techniques described herein). In embodiments, the device management service may simply disable the one or more managed applications because the device management service has control over enabling/disabling the managed applications.

In embodiments, to prevent subsequent use of the client certificate to establish connections with the services, the device management service may perform one or more different actions. For example, the device management service may cause the certificate to be added to a CRL for a CA that issued the client certificate, cause an entry to be added to the certificate revocation table, wherein the entry indicates revocation information for the client certificate, send to one or more of the services a notification that the device is not compliant with the one or more specifications, send to a certificate-based identity provider a notification that the device is not compliant with the one or more specifications (wherein the certificate-based identity provider receives/authenticates connection requests according to a federated identity protocol such as open ID connect (OIDC) or security assertion markup language (SAML)), and/or send to an agent on the device an instruction to disable the client certificate or to remove the client certificate from the device.

The device management service may re-enable a certificate or send a new certificate to a device. For example, in response to a determination that the configuration of the device has become compliant with the one or more specifications for the device, the device management service may send to an agent on the device an instruction to enable use of the client certificate to establish connections with the services and/or send to the agent on the device a new client certificate to enable use of the new client certificate to establish connections with the services.

In embodiments, the device management service may cause a certificate to be disabled and/or removed from a device. For example, in response to the determination that the configuration of the device is no longer compliant with the one or more specifications for the device, the device management service may send to an agent on the device an instruction to disable the client certificate or to remove the client certificate from the device and send to a certificate-based identity provider or to one or more of the services a notification that the device is not compliant with the one or more specifications.

The device management service may have different ways to determine that the configuration of the device is no longer compliant with specifications. For example, to determine that a configuration of the device is no longer compliant with one or more specifications for the device, the device management service may receive, from an agent on the device, an indication that a configuration of the device is no longer compliant with the one or more specifications for the device. In embodiments, the device management service may not receive an indication that the device is compliant with the one or more specifications for a threshold period of time and in response, determine that a configuration of the device is no longer compliant with one or more specifications. In some embodiments, the device management service may receive, from an agent on the device, data indicating a configuration of the device and based on the data indicating the configuration of the device, determine that the device is no longer compliant with the one or more specifications for the device.

Figure 2:
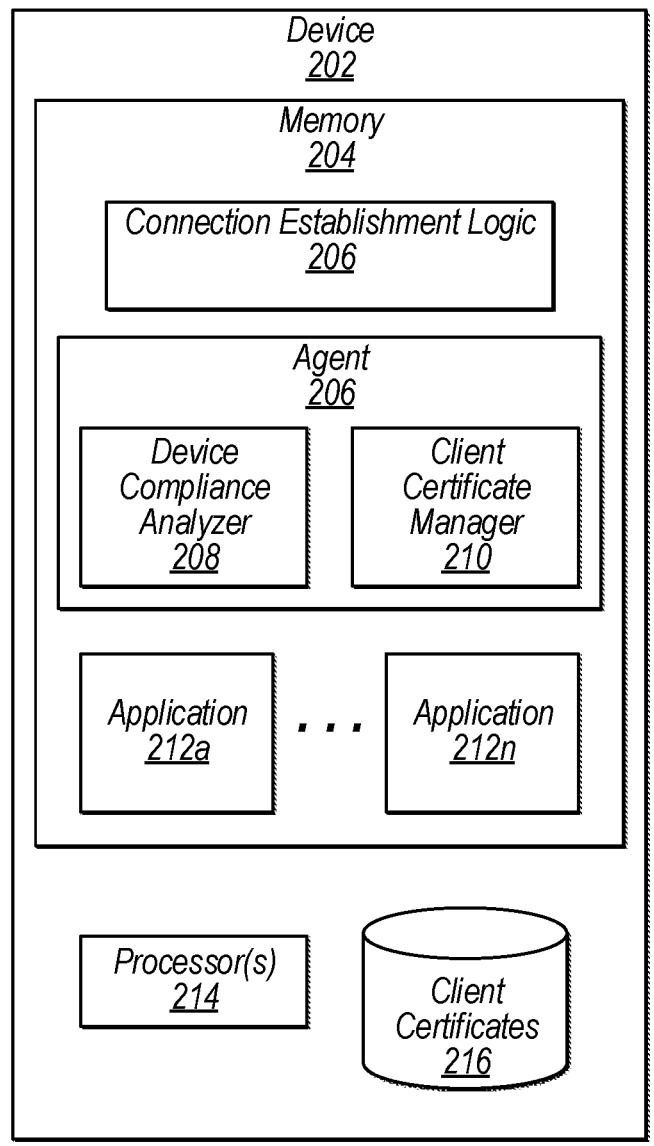
FIG. 2 illustrates an agent for a device management service installed on a device, according to some embodiments.

FIG. 2 illustrates an agent for a device management service installed on a device, according to some embodiments. As depicted, the device 202 (e.g., one of the devices 108) includes a memory 204 that includes connection establishment logic 205. In embodiments, the connection establishment logic may be any application logic and/or operating system logic that establishes, at least in part, one or more connections between the device (e.g., one or more applications running on the device) and a service (e.g., one or more services 104). For example, an internet browser application may include some or all of the connection establishment logic used to establish a connection from the device side.

The memory also includes an agent 206 that includes a device compliance analyzer 208 and client certificate manager 210. In embodiments, the device compliance analyzer 208 and client certificate manager 210 perform the same or similar functions as those performed by the device compliance analyzer 128 and client certificate manager 130 of FIG. 1. For example, the device compliance analyzer 208 may determine whether a configuration of the device is compliant or is no longer compliant with one or more specifications for the device and the client certificate manager 210 may enable/disable one or more client certificates on the device, remove one or more client certificates from the device, and/or request one or more new client certificates for the device.

The memory also includes any number of applications 212. The device may also include one or more processors 214 and any number of client certificates 216 that may be used by any number of the applications 212 to establish connections with services. In some embodiments, each application 212 may be assigned its own assigned client certificate 216 (e.g., stored in the operating memory 204 and/or on another data store of the device) to establish a connection with a service. In embodiments, each of the applications may have a valid client certificate to establish connections with one or more respective services or each of the applications may have a disabled or non-existent client certificate on the device (depending on whether the device is in compliance). In embodiments, zero or more of the applications may be managed applications and zero or more of the applications may be non-managed applications, as described in FIG. 1.

Figure 3:
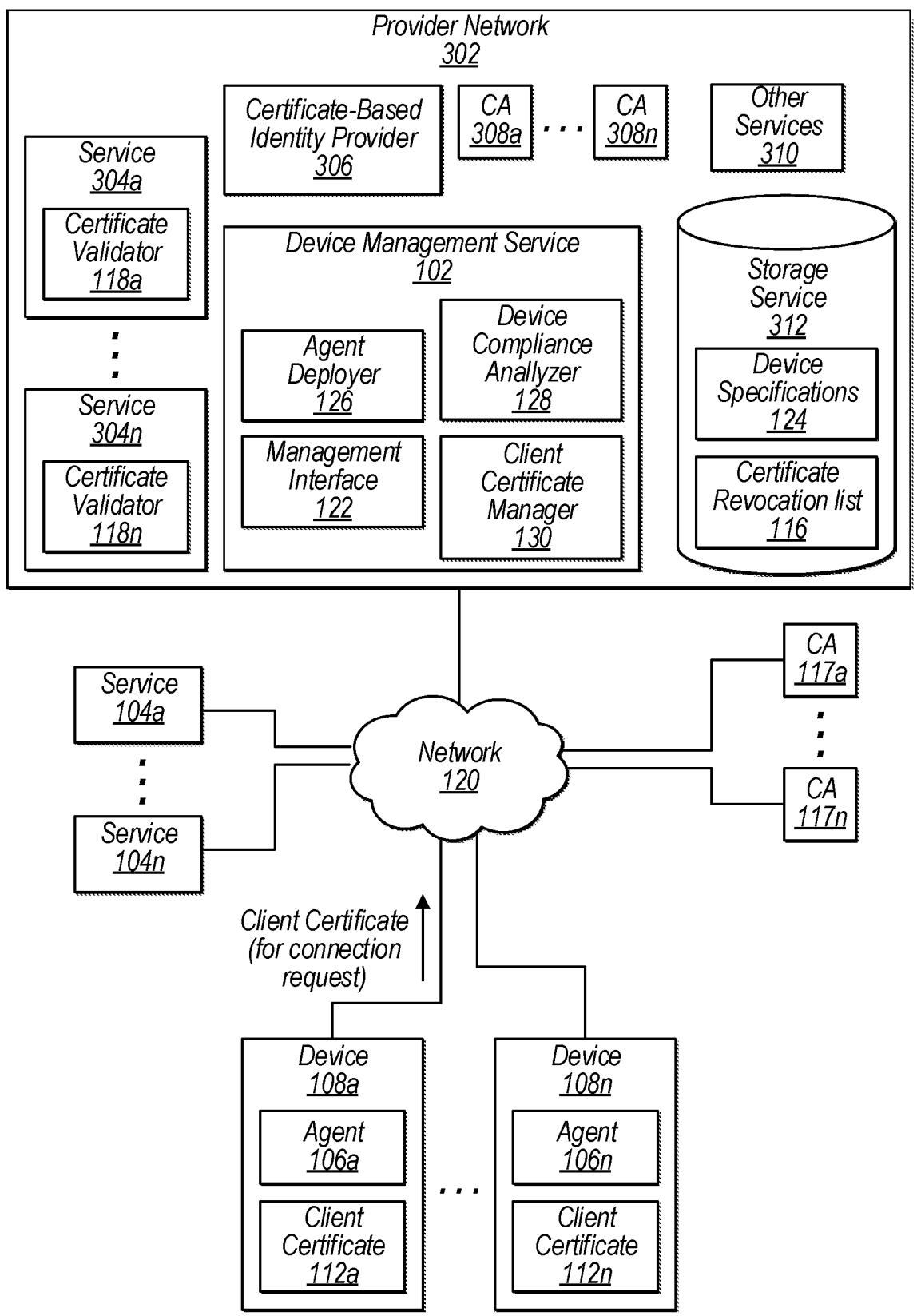
FIG. 3 illustrates a system for using a certificate-based protocol to enforce compliance of devices with specifications, according to some embodiments.

FIG. 3 illustrates a system for using a certificate-based protocol to enforce compliance of devices with specifications, according to some embodiments. In the depicted embodiment, a provider network 302 includes some of the components described for the device management service of FIG. 1. In addition, the provider network may include services 304, a certificate-based identity provider 306, CAs 308, and any other number of services 310. Thus, the device management service may function in the same or similar way as described in FIG. 1, but many of the components reside within the provider network and therefore may be under control of the network and/or network administrators of the provider network.

In embodiments, a storage service 312 of the provider network stores the device specifications 124 and the certificate revocation list 116. In some embodiments, the certificate-based identity provider 306 may receive connection requests according to a federated identity protocol (e.g., OIDC or SAML). In response to the device management service 102 determining that the configuration of a device (e.g., device 108a) is no longer compliant with the one or more specifications for the device, the device management service 102 may send to the certificate-based identity provider 306 a notification that the device is not compliant with the one or more specifications. In response to receiving the notification, the certificate-based identity provider 306 may prevent further connections from the device and/or may terminate any currently established connections with the device.

In some embodiments, the certificate-based identity provider 306 may add the client certificate of the client device to a list of revoked or disabled certificates (e.g., identified based on an issuer ID and/or a certificate ID of the certificate). In embodiments, the certificate-based identity provider 306 may identify currently established connections by the issuer ID and/or a certificate ID of the certificate that was used to establish the connection, and then terminate the connection.

Figure 4:
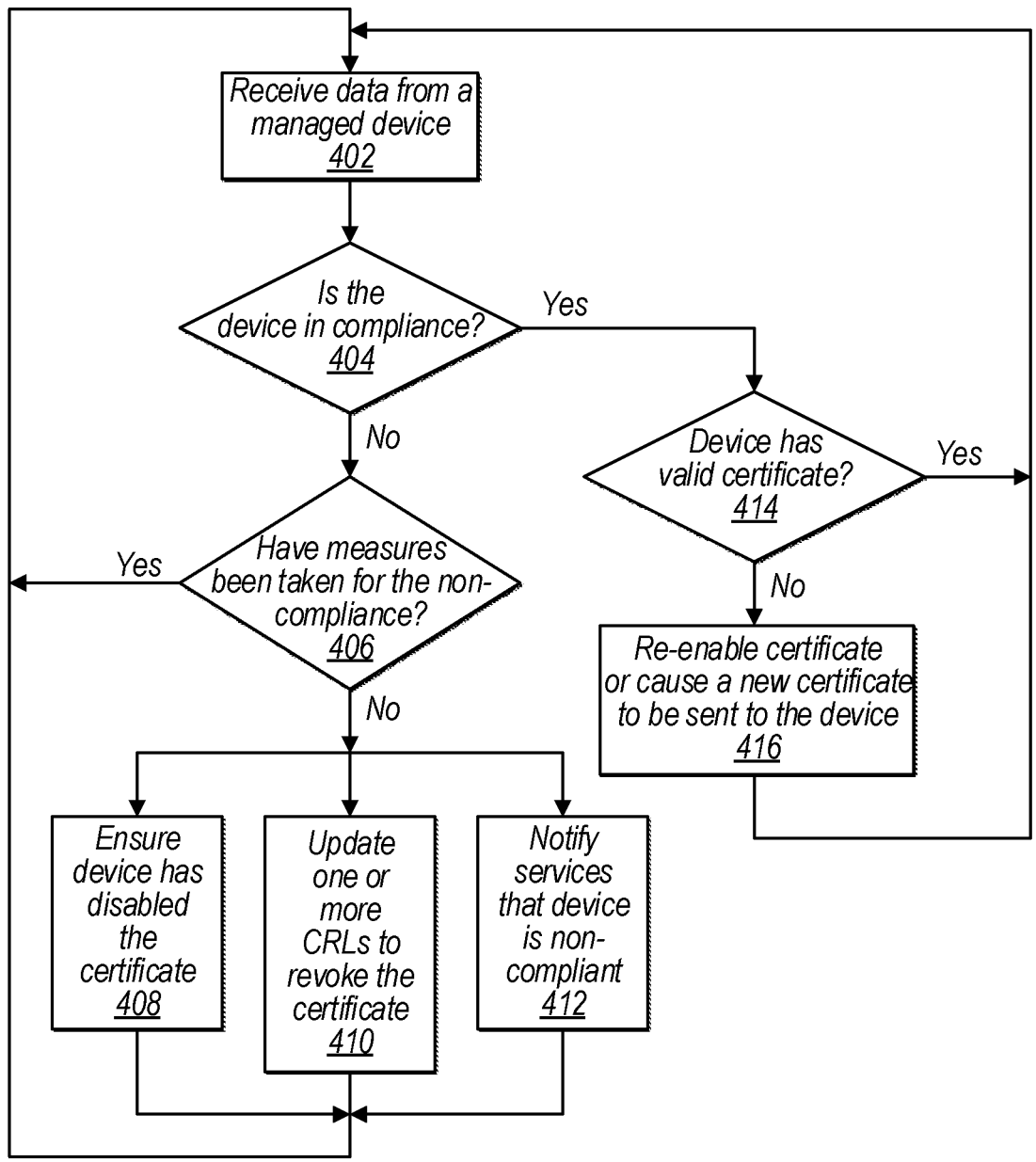
FIG. 4 is a flow diagram that illustrates a device management service enforcing compliance of devices with specifications, according to some embodiments.

FIG. 4 is a flow diagram that illustrates a device management service enforcing compliance of devices with specifications, according to some embodiments. At block 402, the device management service receives data from a managed device.

At block 404, the device management service determines whether the device is in compliance with one or more specifications for the device. If not, then the process proceeds to block 406. The device management service may determine that the device is no longer in compliance using different techniques. For example, the device management service may receive, from an agent on the device, an indication that a configuration of the device is no longer compliant with the one or more specifications for the device. As another example, if the device management service does not receive an indication that the device is compliant with the one or more specifications for a threshold period of time, then the device management service may determine that the device is no longer in compliance.

In some embodiments, the device may receive, from an agent on the device, data indicating a configuration of the device, and based on the data indicating the configuration of the device, the device management service may determine that the device is no longer compliant with the one or more specifications for the device. For example, the data may indicate that hardware, software, and/or an operating system installed on the device is not compliant with the one or more specifications for the device (e.g., the data may indicate a configuration or a version of one or more applications, one or more hardware components, and/or an operating system on the device that do not match or satisfy one or more specifications for the one or more applications, one or more hardware components, and/or an operating system). As another example, the data may indicate that one or more performance metrics for one or more hardware components of the device are below one or more minimum acceptable performance metrics indicated by the one or more specifications.

In embodiments, at least some of the data indicating the configuration of the device (e.g., received from the agent of the device) may comply with a defined language that is used by the device management service and agents to describe the current configuration of the device and/or specifications for the device (e.g., the configuration or version of one or more applications, one or more hardware components, and/or an operating system on the device). This may allow the device management service to quickly and accurately identify the configuration of the device and whether or not the device is in compliance with the one or more specifications.

In some embodiments, a user/administrator may provide the one or more specifications for devices using the defined language. In embodiments, this provides a convenient way for an administrator to apply specify desired configurations for a large number of devices and to reduce errors that could be made when specifying different configurations that are desired for different groups of devices.

At block 406, the device management service determines whether measures have already been taken for the non-compliant device. If so, then the process returns to block 402. If measures have not yet been taken for the non-compliant device (e.g., the device recently became non-compliant), then the process may perform one or more of blocks 408, 410, and/or 412. In embodiments, at block 408 the device management service may ensure the device disabled the certificate (e.g., instruct the device to disable and/or remove the certificate), at block 410 the device management service may update one or more CRLs to revoke the certificate, and/or at block 412 the device management service may notify one or more services that the device is non-compliant (e.g., services that currently have an established connection with the device).

At block 404, if the device management service determines that the device is in compliance with the one or more specifications for the device, then at block 414, the device management service determines whether the device has a valid certificate. If so, then the process returns to block 402. If the device management service determines that the device does not have a valid certificate, then at block 416, the device management service causes one or more client certificates to be re-enabled on the device and/or causes a new certificate to be sent to the device. For example, the device management service may instruct a CA to issue and/or send a new client certificate to the device, or the device management service itself may send a new client certificate to the device (e.g., by generating a new one or using a client certificate stored by the service).

Figure 5:
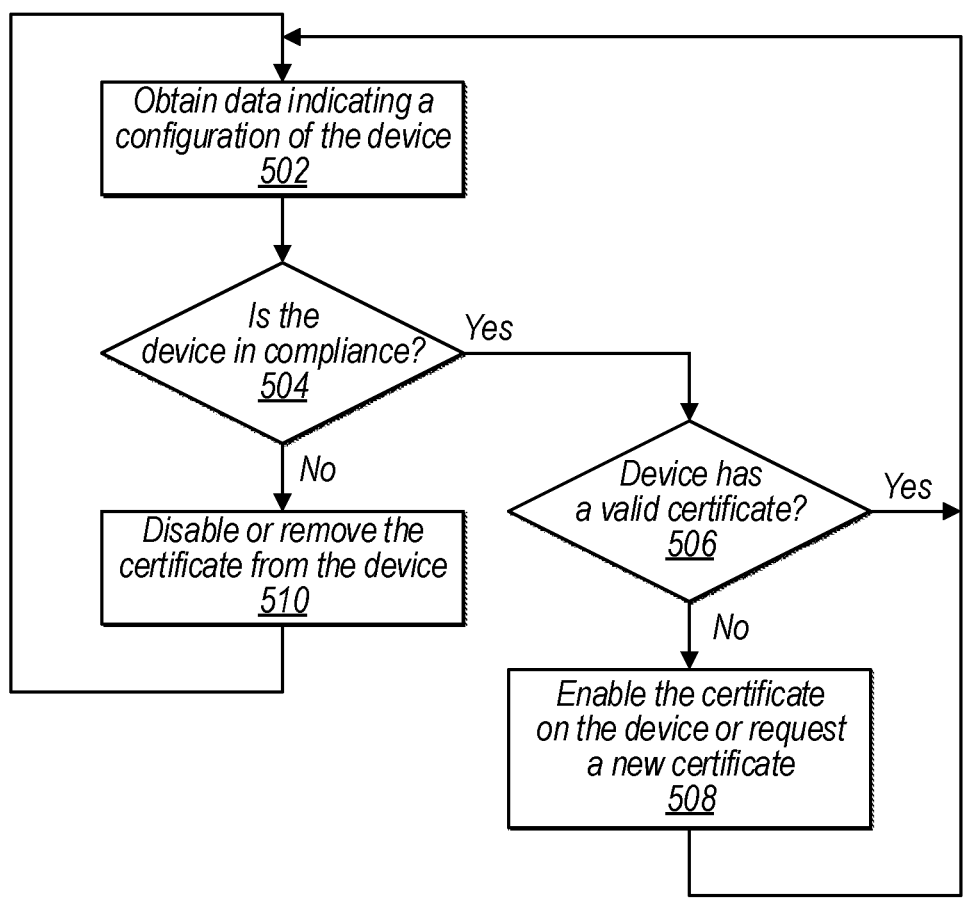
FIG. 5 is a flow diagram that illustrates a device management agent on a device enforcing compliance of the device with specifications, according to some embodiments.
Figure 6:
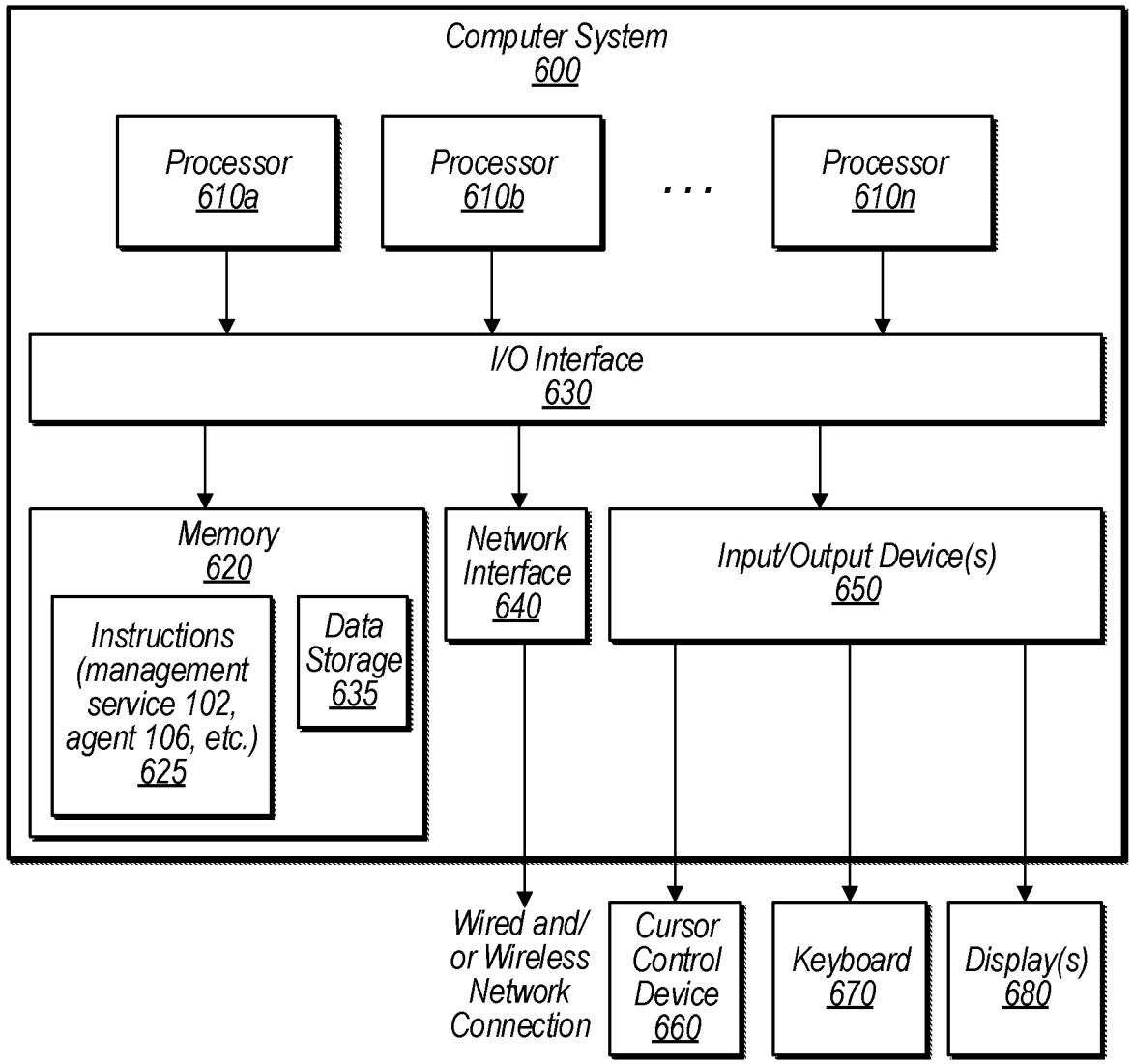
FIG. 6 is a block diagram illustrating an example computer system that implements some or all of the techniques described herein, according to some embodiments.

FIG. 5 is a flow diagram that illustrates a device management agent on a device enforcing compliance of the device with specifications, according to some embodiments. At block 502, the agent obtains data indicating a configuration of the device. In embodiments, the data indicating the configuration of the device may be the same or similar data as described fro FIG. 4. For example, the obtained data may indicate a configuration or a version of one or more applications, one or more hardware components, and/or an operating system installed on the device.

At block 504, the agent determines if the device is compliant. For example, the agent may determine whether the configuration or a version of one or more applications, one or more hardware components, and/or an operating system installed on the device matches or satisfies one or more specifications for the one or more applications, one or more hardware components, and/or an operating system. If the agent determines that the device is compliant, then the agent determines if there is a valid/enabled certificate on the device at block 506. If so, the process may return to block 502.

In some embodiments, the process may wait for at least a threshold period of time before returning to block 502 to obtain additional data and/or determine whether the device is compliant. For example, the agent may perform the obtaining of the data and/or the determining whether the device is compliant according to a schedule (e.g., in response to a triggering function or at periodic intervals such as every 15 minutes).

Returning to block 506, if the agent determines there is not a valid/enabled certificate on the device, then at block 508, the agent enables the certificate (if an invalid/disabled certificate is on the device) or the agent requests a new certificate for the device (e.g., sends a request to the device management service or a CA). The process may then return to block 502. As described above, the process may wait for at least a threshold period of time before returning to block 502 to obtain additional data and/or determine whether the device is compliant.

Returning to block 504, if the agent determines that the device is not compliant (e.g., the configuration or the version of one or more applications, one or more hardware components, and/or an operating system installed on the device does not match or satisfy one or more specifications), then at block 510, the agent disables a client certificate on the device or removes the client certificate from the device. The process may then return to block 502.

In some embodiments, the process may wait for at least a threshold period of time before returning to block 502 to obtain additional data and/or determine whether the device is compliant. For example, the agent may perform the obtaining of the data and/or the determining whether the device is compliant according to a schedule (e.g., in response to a triggering function or at periodic intervals such as every 15 minutes).

Any of various computer systems may be configured to implement processes associated with the certificate revocation manager, the services, networks, or any components of the above figures. For example, FIG. 7 is a block diagram illustrating an example computer system that implements some or all of the techniques described herein, according to some embodiments.

In various embodiments, the certificate revocation manager, the services, networks, or any components of any of FIGS. 1-6 may each include one or more computer systems 700 such as that illustrated in FIG. 7. In embodiments, the certificate revocation manager, the services, networks, or any components may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for the certificate revocation manager, the services, etc.), are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710).

In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 770 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the certificate revocation manager, the services, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network to implement a device management service, wherein the device management service is configured to:
for a remote device of a plurality of remote devices managed by the device management service, wherein the remote devices are configured to establish connections with services implemented by the provider network or other networks by providing respective client certificates according to a certificate-based protocol:
receive, by the device management service of the provider network from the remote device, an indication that a configuration of the remote device is no longer compliant with specifications for the remote device,
wherein the indication received by the provider network that the configuration of the remote device is no longer compliant with the specifications is based on a previous determination made by an agent implemented by the remote device according to a schedule, using data that is also obtained according to the schedule by the agent at the remote device indicating the configuration of the remote device, that the configuration of the remote device is no longer compliant with the specifications for the remote device;
based on the reception, by the device management service of the provider network from the remote device, of the indication that the configuration of the remote device is no longer compliant with the specifications for the remote device as previously determined by the agent implemented by the remote device, determine, by the device management service of the provider network, that the configuration of the remote device is no longer compliant with the specifications for the remote device; and
in response to the determination, by the device management service of the provider network, that the configuration of the remote device is no longer compliant with the specifications for the remote device as previously determined by the agent of the remote device:
send from the device management service of the provider network to a certificate-based identity provider of the provider network a notification that the remote device is not compliant with the specifications to cause the certificate-based identity provider to prevent further connections from the remote device with the services;
wherein the remote device comprises one or more managed applications installed by the device management service and one or more other applications not installed by the device management service, and wherein the device management service is configured to:
in response to the determination that the configuration of the remote device is no longer compliant with the specifications for the remote device:
prevent subsequent use of the client certificate by the one or more other applications; and
disable the one or more managed applications installed by the device management service.

2. The system as recited in claim 1, wherein the device management service is further configured to prevent subsequent use of the client certificate to establish connections with the services implemented by the provider network or other networks, and wherein to prevent subsequent use of the client certificate to establish connections with the services, the device management service is configured to perform one or more of:
cause the certificate to be added to a certificate revocation list (CRL) for a certificate authority (CA) that issued the client certificate,
cause an entry to be added to a certificate revocation table, wherein the system further comprises a data store comprising the certificate revocation table, and wherein the entry indicates revocation information for the client certificate,
send to one or more of the services a notification that the remote device is not compliant with the specifications, or
send to an agent on the remote device an instruction to disable the client certificate or to remove the client certificate from the remote device.

3. The system as recited in claim 1, wherein the device management service is further configured to:
in response to a determination that the configuration of the remote device has become compliant with the specifications for the remote device:
send to an agent on the remote device an instruction to enable use of the client certificate to establish connections with the services, or
cause a new client certificate to be sent to the remote device to enable use of the new client certificate to establish connections with the services.

4. The system as recited in claim 1, wherein the device management service is further configured to:
in response to the determination that the configuration of the remote device is no longer compliant with the specifications for the remote device:
send to an agent on the remote device an instruction to disable the client certificate or to remove the client certificate from the remote device.

5. The system as recited in claim 1, wherein to determine that the configuration of the remote device is no longer compliant with specifications for the remote device, the device management service is configured to perform one or more of:
not receive an indication that the remote device is compliant with the specifications for a threshold period of time, or
receive, from an agent on the remote device, data indicating a configuration of the remote device; and
based on the data indicating the configuration of the remote device, determine that the remote device is no longer compliant with the specifications for the remote device.

6. A method, comprising:
performing, by one or more computing devices of a provider network that implement a device management service:
for a remote device of one or more remote devices, wherein the remote devices are configured to establish connections with services implemented by the provider network or other networks by providing respective client certificates according to a certificate-based protocol:
receiving, by the device management service of the provider network from the remote device, an indication that a configuration of the remote device is no longer compliant with specifications for the remote device,
wherein the indication received by the provider network that the configuration of the remote device is no longer compliant with the specifications is based on a previous determination made by an agent implemented by the remote device according to a schedule, using data that is also obtained according to the schedule by the agent at the remote device indicating the configuration of the remote device, that the configuration of the remote device is no longer compliant with the specifications for the remote device;
based on the reception, by the device management service from the remote device, of the indication that the configuration of the remote device is no longer compliant with the specifications for the remote device as previously determined by the agent implemented by the remote device, determining, by the device management service, that the configuration of the remote device is no longer compliant with the specifications for the remote device; and
in response to the determination, by the device management service, that the configuration of the remote device is no longer compliant with the specifications for the remote device as previously determined by the agent of the remote device:
sending from the device management service of the provider network to a certificate-based identity provider of the provider network a notification that the remote device is not compliant with the specifications to cause the certificate-based identity provider to prevent further connections from the remote device with the services;
wherein the remote device comprises one or more managed applications installed by the device management service and one or more other applications not installed by the device management service, the method further comprising:
in response to the determination that the configuration of the remote device is no longer compliant with the specifications for the remote device:
preventing subsequent use of the client certificate by the one or more other applications; and
disabling the one or more managed applications installed by the device management service.

7. The method as recited in claim 6, further comprising preventing subsequent use of the client certificate to establish connections with the services implemented by the provider network or other networks, wherein preventing subsequent use of the client certificate to establish connections with the services comprises one or more of:
causing the certificate to be added to a certificate revocation list (CRL) for a certificate authority (CA) that issued the client certificate,
causing an entry to be added to a certificate revocation table, wherein the entry indicates revocation information for the client certificate,
sending to one or more of the services a notification that the remote device is not compliant with the specifications, or
sending to an agent on the remote device an instruction to disable the client certificate or to remove the client certificate from the remote device.

8. The method as recited in claim 6, further comprising:
in response to determining that the configuration of the remote device has become compliant with the specifications for the remote device:

sending to an agent on the remote device an instruction to enable use of the client certificate to establish connections with the services, or cause a new client certificate to be sent to the remote device to enable use of the new client certificate to establish connections with the services.

9. The method as recited in claim 6, further comprising:
in response to determining that the configuration of the remote device is no longer compliant with the specifications for the remote device:
sending to an agent on the remote device an instruction to disable the client certificate or to remove the client certificate from the remote device.

10. The method as recited in claim 6, further comprising determining that a configuration of another device is no longer compliant with specifications for the other device, wherein determining that the configuration of the other device is no longer compliant comprises:
not receiving an indication that the other device is compliant with the specifications for a threshold period of time, or
receiving, from an agent on the other device, data indicating a configuration of the other device; and
based on the data indicating the configuration of the other device, determining that the other device is no longer compliant with the specifications for the other device.

11. The method as recited in claim 6, wherein the specifications for the remote device comprise one or more of:
a configuration or version of one or more applications on the remote device,
a configuration or version of one or more hardware components on the remote device,
a configuration or version of an operating system on the remote device.

12. The method as recited in claim 6, wherein the provider network comprises the one or more computing devices that implement the device management service, and wherein the provider network implements one or more of the services.

13. The method as recited in claim 12, wherein the certificate-based identity provider receives connection requests according to a federated identity protocol.

14. A device managed by a remote device management service, the device comprising:
one or more processors; and
one or more memories, wherein the one or more memories have stored thereon instructions, which when executed by the one or more processors, cause the one or more processors to:
establish one or more connections with one or more services implemented by a provider network or other networks by providing a client certificate according to a certificate-based protocol; and
implement a device management agent to:
determine, by the device management agent of the device according to a schedule, using data that is also obtained according to the schedule by the device management agent at the device indicating a configuration of the device, that the configuration of the device is no longer compliant with specifications for the device, wherein the device comprises one or more managed applications installed by the remote device management service and one or more other applications not installed by the remote device management service; and
in response to the determination that the configuration of the device is no longer compliant with the specifications for the device, send from the device to the remote device management service an indication that the device is no longer compliant with the specifications as previously determined by the device management agent implemented by the device,
wherein a notification that the device is not compliant with the specifications is sent from the remote device management service to a certificate-based identity provider of the provider network to cause the certificate-based identity provider to prevent further connections from the device with the one or more services, to prevent subsequent use of the client certificate by the one or more other applications, and to disable the one or more managed applications installed by the device management service in response to a determination, by the remote device management service based on reception of the indication, that the device is no longer compliant with the specifications as previously determined by the device management agent implemented by the device.

15. The device as recited in claim 14, wherein use of the client certificate to establish connections with the one or more services implemented by the provider network or other networks subsequent to the sending of the indication is prevented, wherein to prevent subsequent use of the client certificate to establish connections with the one or more services, the instructions when executed by the one or more processors cause the device management agent to perform one or more of:
disable the client certificate.

16. The device as recited in claim 14, wherein the instructions when executed by the one or more processors cause the device management agent to:
in response to a determination that the configuration of the device has become compliant with the specifications for the device:
enable the client certificate to establish connections with the one or more services, or
send to the device management service a request fora new client certificate.

17. The device as recited in claim 14, wherein use of the client certificate to establish connections with the one or more services implemented by the provider network or other networks subsequent to the sending of the indication is prevented, wherein to prevent subsequent use of the client certificate to establish connections with the one or more services, the instructions when executed by the one or more processors cause the device management agent to perform:
remove the client certificate from the device.

18. The device as recited in claim 14, wherein the specifications for the device comprise one or more of:
a configuration or version of one or more applications on the device,
a configuration or version of one or more hardware components on the device,
a configuration or version of an operating system on the device.

19. The device as recited in claim 14, wherein to determine that the configuration of the device is no longer compliant with specifications for the remote device, the instructions when executed by the one or more processors cause the device management agent to:

perform, according to the schedule at periodic intervals, the determination that the configuration of the remote device is no longer compliant with specifications for the device.

* * * * *